United States Patent [19] [11] 4,246,581
DiToro [45] Jan. 20, 1981

[54] DIRECTION FINDER

[75] Inventor: Michael J. DiToro, Massapequa, N.Y.

[73] Assignee: General Signal Corporation, Stamford, Conn.

[21] Appl. No.: 8,447

[22] Filed: Feb. 1, 1979

[51] Int. Cl.³ .............................................. G01S 3/12
[52] U.S. Cl. .................................... 343/116; 343/120
[58] Field of Search ................. 343/116, 120, 7 PL, 343/113 DE

[56] References Cited

U.S. PATENT DOCUMENTS

| 2,415,954 | 2/1947 | Luck | 343/116 |
| 2,762,043 | 9/1956 | Earp | 343/120 |
| 2,860,336 | 11/1958 | Earp et al. | 343/116 X |
| 4,107,692 | 8/1978 | Hutcheon et al. | 343/120 |

Primary Examiner—Malcolm F. Hubler
Attorney, Agent, or Firm—Milton E. Kleinman; Stanley Green

[57] ABSTRACT

An improved direction finding apparatus for determining the azimuth of a target source of radio frequency signals using in an optimal manner the signals from a central antenna and an associated array of direction finding antennas. The signals of the antennas are repeatedly scanned to generate running averages of the in-phase and quadrature phase components of the RF phasors and to thereby reduce the effect of system noise on the measurement of the phasors. A series of computed candidate phasors corresponding to candidate target sources are then compared to the measured phasors and the azimuth of the candidate target having phasors most closely approximating the measured phasors is an optimal determination of the unknown azimuth of the actual target.

17 Claims, 6 Drawing Figures

DIRECTION FINDER

BACKGROUND OF THE INVENTION

The invention relates to an improved direction finder for finding the azimuth of a target source of RF signals, and, more particularly, to such a direction finder including means for accurately determining the azimuth of a target source in a system having a relatively small signal to noise ratio.

Prior art direction finding systems have typically employed a circular antenna array to receive the signals that are transmitted by a particular RF target source. Thus, the RF signal that is received by each antenna is shifted in phase with respect to the corresponding signals of adjacent antennas in the array.

In operation, an electronic commutator is used to successively sample the RF signals of each of the antennas of the array and the sampled RF signals are typically converted to corresponding IF signals that are then applied to a tracking phase-locked loop (PLL). The output of the PLL corresponds to the magnitude of the phase shift between successive antennas of the array.

The PLL output signal is applied to a sample and hold circuit to provide a stair-case approximation of a sinusoidal waveform that represents the differential phase shift of the RF signal between adjacent antennas in the array. This stair-case signal is then passed to a band pass filter having a center frequency equal to the sampling frequency of the commutator and the zero crossing of the output of this filter identifies the antenna that is closest in line to the target source. The position of the zero crossing antenna with respect to a north reference antenna then provides an approximation of the azimuth of the target source.

In such prior art systems, large system noise and the 360° ambiguity in the PLL tracking of a noisy phase angle will cause large and erroneous jumps in the incremental phase-shift measurements between adjacent antennas unless the antennas of the array are closely spaced. However, if the antennas of the array are closely spaced, the magnitude of the incremental phase shift between adjacent antennas will be decreased, thereby decreasing the signal to noise ratio of the received signals and reducing the accuracy of measurement of the signals. Thus, as system noise increases, the accuracy of such prior art systems is rapidly reduced.

Accordingly, it is an object of the invention to provide a direction finding apparatus for accurately determining the azimuth of a signal source in systems having relatively small signal to noise ratios.

A further object of the invention is to provide such an apparatus having a gradual rather than catastrophic degradation in accuracy with increasing system noise.

Another object of the invention is to provide a direction finding apparatus that makes optimal use of all of the phasor data that are received by the antennas of a direction finding array.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the improved direction finding apparatus, according to the invention, includes means for reducing the effect of noise associated with the phasor data in a direction finding system.

More particularly, an embodiment of the invention includes a circular array of antennas and a central antenna for receiving signals from an RF target source. The RF signals that are received at the central antenna are converted to corresponding IF signals that are applied to a first phase locked loop circuit that generates a first phase-locked IF signal. The first phase-locked signal is then applied to another phase locked loop that generates a second signal that is shifted 90° in phase with respect to the first signal.

A commutation means successively scans each of the antennas in the circular array for a particular commutation time interval and generates corresponding IF select output signals for each of the antennas in the array. The entire array of antennas is scanned over an array scanning time period and the array scanning is repeated in serial scanning time periods.

A coordinate generation means receives the select output signals and the associated phase-locked first and second signals for each antenna of the array and generates corresponding first and second coordinate average signals. The coordinate average signals are a running average of the baseband rectangular coordinate components of the RF phasor for the antenna and are averaged over many array scanning time periods to reduce the effect of system noise.

A computation means compares candidate coordinate signals corresponding to the rectangular components of the candidate phasors of candidate azimuths of the targets to the first and second coordinate average signals of each antenna to identify a candidate azimuth target having coordinate signals most closely approximating the coordinate average signals of the antennas and an azimuth approximating the azimuth of the target source.

A more accurate azimuth approximation may be obtained by interpolating between the candidate azimuths to derive an azimuth that more closely approximates that of the actual target. In addition, the RF signal of the target may be monitored by converting the RF signal of the central antenna to a corresponding audio signal.

DETAILED DESCRIPTION OF PREFERRED EMBODIMENTS

Figure 1:
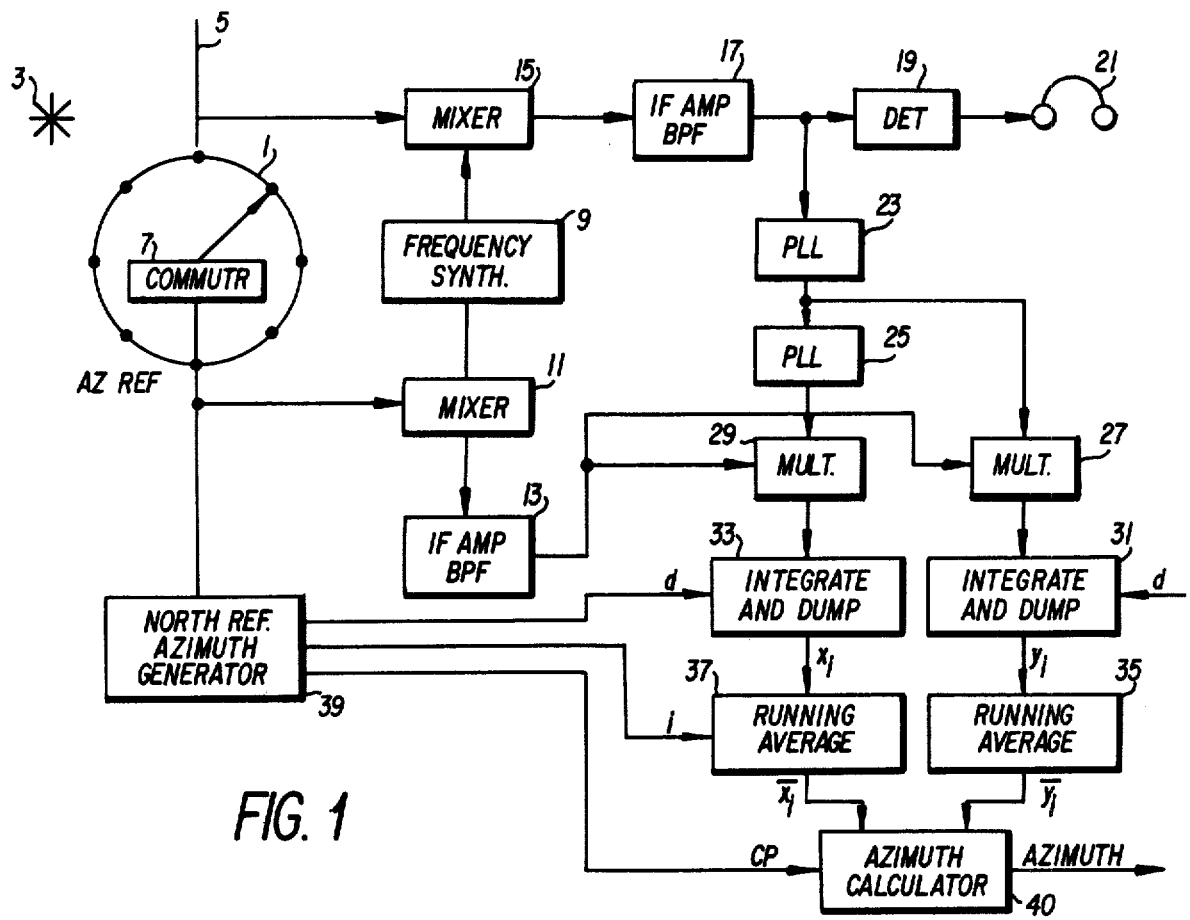
FIG. 1 shows a block diagram of an embodiment of a direction finding apparatus in accordance with the invention.

The remaining portion of this specification will describe preferred embodiments of the invention when read in conjunction with the attached drawings, in which like reference characters identify identical apparatus.

FIG. 1 shows a block diagram of a direction-finding system in accordance with the invention. It will be appreciated from an examination of FIG. 1 that an antenna array 1 and a central antenna 5 positioned at the center of the array 1 are employed to receive the radio frequency (RF) signals associated with a particular signal source 3. It should be understood that the spatial position of the various antennas of the array 1 define the relative phase shifts of the various signals that are received by the antennas of the array from the signal source 3.

The RF signals that are received by the members of the antenna array 1 are sequentially commutated, for example by an electronic commutator 7, in a manner known to the art. The output of the electronic commutator 7 and the output of a frequency synthesizer 9 are applied to a mixer 11 that combines the signals and applies the signals to an intermediate frequency (IF) amplifier and band pass filter 13. Thus, the multi-channel radio frequency signal that is received at the antenna array is converted to a corresponding fixed intermediate frequency signal.

The radio frequency signal that is received by the central antenna 5 may be converted to a corresponding audio signal in a manner known to the art by applying the RF signal of the central antenna to a mixer 15, IF amplifier and band pass filter 17, a detector 19 and an associated headset 21. Thus, the radio frequency signal may be audio monitored.

In accordance with the operation of the invention, the intermediate frequency signal from the central antenna is applied to a first phase-locked loop circuit 23 that may, for example, include a detector, local oscillator and associated feedback oscillator-adjust circuitry. Such a tracking phase-locked loop is well-known to the art and is commercially available. The output of the first phase-locked loop circuit 23 is an IF signal that may be expressed as: $E_X(t) = A \cos(2\pi F_c t)$, where A is a constant and $F_c$ is the frequency of the IF carrier.

The IF signal $E_X(t)$ of the first phase-locked loop 23 is applied to a second phase-locked loop 25 that generates a signal $E_Y(t)$ which may be expressed as:

$$E_Y(t) = A \sin(2\pi F_c t).$$

It should be appreciated that the 90° phase shift of $E_Y(t)$ will not change if the frequency of the IF signal changes and also, it should be understood that the IF signal associated with the central antenna necessarily maintains a constant phase relation to the RF signal from the signal source 3.

The IF signal that is generated at the output of the amplifier and band pass filter 13 may be expressed as a function of several system parameters. For example, assuming that the signal source or target 3 is located at an azimuth $\beta$, the RF wavelength is $\lambda$, the number of antennas in the array is M, the antenna spacing is $\Delta\alpha = 2\pi/M$, the array diameter is D, the noise of an antenna i is $N_i$ and a factor L is defined as $\pi D/\lambda$, then the signal received by the ith antenna of the array is:

$$e_i(t) = A \cos[(2\pi F_c t - L \cos(i\Delta\alpha - \beta)] + n_i.$$

The signals $E_X(t)$ and $E_Y(t)$ are applied to respective multiplier circuits 27 and 29 that are known to the art. The multiplier circuits 27 and 29 also receive the signal $e_i(t)$ and respectively generate product signals $e_i(t) \cdot E_Y(t)$ and $e_i(t) \cdot E_X(t)$.

The product signals are then applied to corresponding integrate and dump circuits 31 and 33 that are known to the art and that operate to integrate the received product signals over a time T, which is preferably a multiple of $1/F_c$, and to thereafter dump the integrated product signals in response to a dump pulse d. The dumped product baseband signals are passed to associated running average generation circuits 35 and 37. The dump signals d are generated in accordance with the invention by a north reference azimuth generator 39 that operates in a manner known to the art to generate a dump pulse d upon a transition of the electronic commutator 7 from on antenna of the array 1 to the next successive antenna of the array.

Thus, the integrate and dump circuit 33 generates a signal corresponding to:

$$X_i = (1/T) \int_O^T E_X(t) \cdot e_i(t) dt.$$

or approximately $A^2/2 \cos[L \cos(i\Delta\alpha - \beta)] + n_i$ where T is the time between the selection of the ith and the i+1 antennas by the commutator 7 and T is much greater than $1/F_c$.

Likewise, the baseband signal at the output of the integrate and dump circuit 31 is:

$$Y_i \approx (A^2/2) \sin[(i\Delta\alpha - \beta)] + n_i.$$

It should be appreciated that the designated integrated signals $X_i$ and $Y_i$ correspond to the base band rectangular components of the RF phasor that is received at the ith antenna of the array 1. As the commutator 7 scans each successive antenna of the array, rectangular components of the RF phasor for the scanned antenna are generated at the respective outputs of the integrate and dump circuits 31 and 33. Thus, if M is the number of antennas in the array, the antennas of the array are scanned over a scan cycle having a period M · T and this antenna scan cycle is continuously repeated.

Over one scan cycle of the antenna array successive signals $X_i$ and $Y_i$ for i = 1 to M for each of the antennas of the array are generated and applied to corresponding running average generation circuits 35 and 37. The running average circuits 35 and 37, shown in more detail in FIG. 2, operate to receive the measured values of $X_i$ and $Y_i$ for successive scan cycles of the antenna array 1 and to generate corresponding running averages $X_i$ and $Y_i$ of the signals received for each antenna over many scan cycles of the antenna array.

The objective of the running average circuits 37, 35 is to obtain $X_{AVG}$ and $Y_{AVG}$ based on $X_{AVG}$(Old), $Y_{AVG}$(Old), $X_i$(New) and $Y_i$(New) where $X_{AVG}$(Old) represents a running average prior to the latest sample, $X_i$(New) represents the latest sample i and $Y_{AVG}$(Old) and $Y_i$(New) are corresponding values. The algorithm for this can be expressed as:

$$X_{AVG}(\text{New}) = \frac{i-1}{i} X_{AVG}(\text{Old}) + \frac{1}{i} X_i(\text{New}).$$

Figure 2:
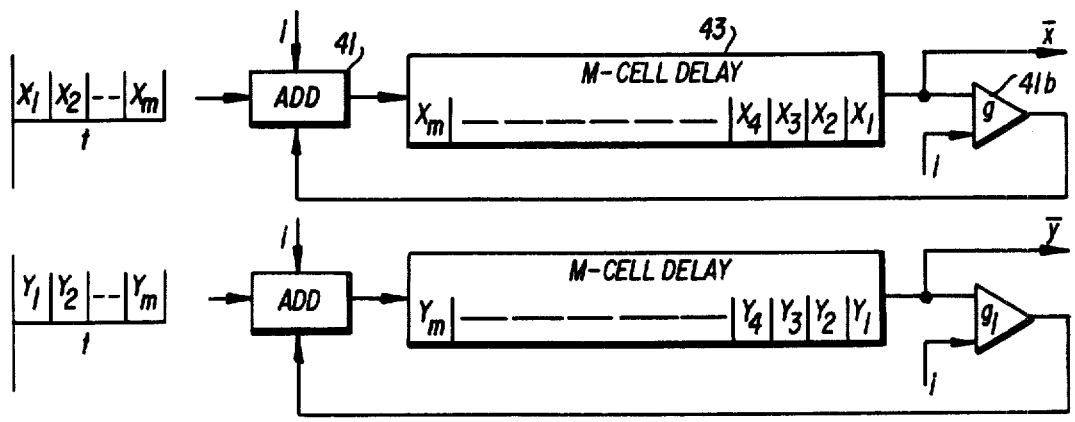
FIG. 2 shows a more detailed block diagram of the running average generator of FIG. 1.

While this can be implemented in either analog or digital forms, digital implementation is preferred. FIG. 2 shows such an implementation.

Thus, the circuit 37 receives a first timed sequence of signals $X_1$ through $X_M$ corresponding to a first scan of the antenna array 1. These signals are passed by an adder 41 to an M-cell delay line 43. The time delay of each cell equals the dwell time of the commutator for each one of the M antennas.

Thereafter, the values $X_1$ through $X_M$ for the next successive scan of the antenna array 1 are successively applied to the input of the adder 41. As each successive value of $X_i$ appears at the adder 41, the previous scan corresponding value of $X_i$, multiplied by g, is applied by the delay line 43 to another input of the adder 41 and the corresponding values of $X_i$ are added by the adder 41 and applied to the delay line 43. This operation is repeated for the values $X_1$ through $X_M$ for each scanning cycle of the antenna array. Thus, running averages $\overline{X}_1$ through $\overline{X}_M$ are computed for the associated values of $X_1$ through $X_M$ that are generated over a number of scans of the antenna array. Likewise, running averages $\overline{Y}_1$ through $\overline{Y}_M$ are generated for the respective values $Y_1$ through $Y_M$ of successive antenna scans over a period defined by g.

Those skilled in the art understand that the circuit of FIG. 2 can be implemented in either discrete or random logic.

The north reference azimuth generator includes a clock source, stepping a counter counting modulo M and a second counter counting overflows. Each step of the first counter steps the commutator 7 so that the commutator is synched to the north reference generator. In addition, the second counter counts the scan index i and provides the data to the running average circuits 35, 37. Finally, each time the second counter reaches a predetermined adjustable count $\overline{i}$, it provides a command pulse CP signal to the azimuth calculator 40 to initiate the azimuth determination. After a suitable number of scans, which need not, but may be, equal to the count $\overline{i}$, the second counter may be reset and the running averages cleared.

It should be understood that the running averages of the baseband signals $X_i$ and $Y_i$ are generated to reduce the effect of noise on the accuracy of the azimuth calculation of the invention. More particularly, it should be appreciated that the noise of a running average signal, for example $\overline{X}_i$, is $1/\sqrt{AV}$ of the noise in a corresponding signal $X_i$, where AV is the number of additions that are performed in the averaging process.

Thus, the noise problems that have reduced the accuracy of prior art direction finding systems are avoided by scanning the phasor data $X_i$, $Y_i$ for each antenna over a time period sufficient to generate corresponding running averages $\overline{X}_i$, $\overline{Y}_i$ that have substantially reduced noise components. The running averages for the antennas are stored, for example, in random access computer memory (RAM), disc storage, tape storage or other storage means. At a time larger than the time constant of the running average circuit of FIG. 2, the command pulse CP is generated by the north reference azimuth generator 39 to initiate the calculation of an approximate azimuth for the target source 3 by an azimuth calculator 40.

The method of calculating the approximate azimuth may be better understood with reference to the following mathematical basis for computation.

The azimuth $\beta$ of the target source 3 is unknown; accordingly a candidate fictitious target C having a candidate azimuth $\beta_K$ is assumed and the corresponding baseband candidate signals are:

$$X_{Ki} = \cos[L \cos(i\Delta\alpha - \beta_K)]$$

and $$Y_{Ki} = \sin[L \cos(i\Delta\alpha - \beta_K)],$$

where $\beta_K = K\Delta\alpha$ and where the parameter K spans from 0 to M. The baseband signals $X_{Ki}$ and $Y_{Ki}$ represent the fictitious signal which would be received if the candidate target C were actually located at the azimuth $\beta_M$.

More generally, a candidate fictitious phasor for the ith antenna of the array may be described as the complex variable: $Z_{Ki} = X_{Ki} + jY_{Ki}$, where $j = \sqrt{-1}$. Likewise, the phasor actually measured at the ith antenna is described in terms of running averages of baseband rectangular components as: $\overline{Z}_i = \overline{X}_i + j\overline{Y}_i$.

It should be apparent that the candidate target C having an azimuth $\beta_K$ that most closely approximates the azimuth $\beta$ of the actual target 3 will have candidate phasors $Z_{Ki}$ that most closely approximate the actual measured phasors $\overline{Z}_i$. Therefore the closest approximate candidate azimuth $\beta_K$ is taken as that azimuth which results in the least mean square difference $d^2$ between the phasors actually received $\overline{Z}_i$ and the candidate phasors $Z_{Ki}$.

This difference is:

$$d^2 = \sum_{i=1}^{M} |\overline{Z}_i - Z_{Ki}|^2 = \sum_{i=1}^{M} |\overline{Z}_i|^2 + \sum_{i=1}^{M} |Z_{Ki}|^2 - 2\text{Re} \sum_{i=1}^{M} \overline{Z}_i Z_{Ki}^*,$$

where * means complex conjugate, and Re means "Real part of".

The best choice of $\beta_K$ is that which minimizes $d^2$. Only the last term on the right-hand size varies as $\beta_K$ varies. Hence:

$$\min_{\beta_K} d^2 = \max_{\beta_K} \sum_{i=1}^{M} \overline{Z}_i Z_K^* = \max_{\beta_K} \sum_{i=1}^{M} (\overline{X}_i \cdot X_{Ki} + \overline{Y}_i \cdot Y_{Ki}) = S_K.$$

Figure 4:
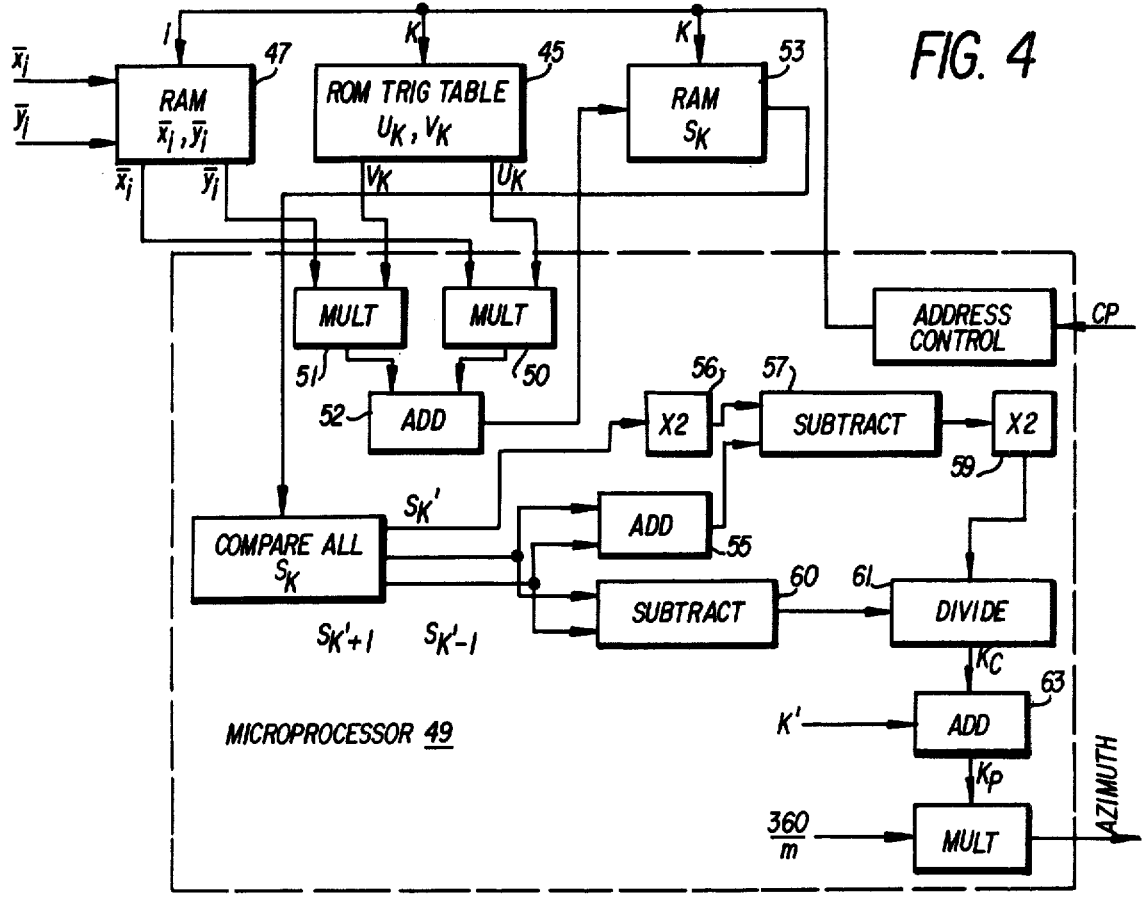
FIG. 4 illustrates a more detailed diagram of the azimuth calculator of FIG. 1.

It should be appreciated that as M gets larger, the value for $S_K$ closely approximates a Bessel function of zero order as K varies smoothly. FIG. 4 illustrates a graph of such a function defining $S_K$ for all values of K and $S_{K'}$ for integer values of K'. Note that $\beta_K = K\Delta\alpha$. The maximum value of $S_K$ is an azimuth equal to $B_{K''} = K''\Delta d$, and most closely approximates the unknown azimuth of the actual target 3.

The antenna system of the invention includes a signal source or target 3 at an azimuth $\beta$ with respect to an azimuth reference antenna positioned, for example at a north reference in the array 1. The antennas of the array 1 are positioned in a circle about the central antenna 5 and, in accordance with the method of the invention, the apparatus of the invention receives phasor data for each of the antennas of the array and generates corresponding running averages $\overline{X}_i$ and $\overline{Y}_i$ as described above. Thereafter, the measured phasor data for each antenna of the array is compared to successive possible candidate azimuths $\beta_K$ that would be generated by a signal source or target $C_K$ at a particular candidate azimuth $\beta_K$. The candidate target $C_K$ that produces phasors most like the measured phasors will, therefore, necessarily define the best estimated azimuth for the actual target 3 at the unknown actual azimuth $\beta$.

Figure 3:
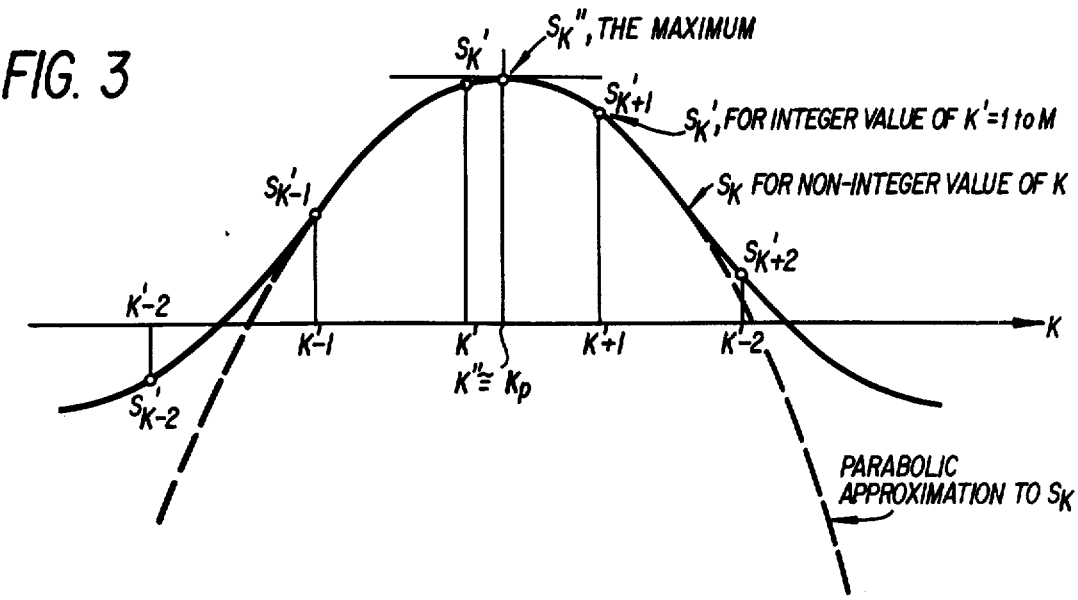
FIG. 3 shows a plot of the factors $S_K$ that are used to determine the best candidate azimuth in accordance with the invention.

FIG. 3 illustrates a plot of $S_K$ that closely approximates the curve of a Bessel function of the zero order. It should be apparent that the shape of the curve of the Bessel function i the vicinity of its maximum value closely approximates the shape of a parabola. Therefore, it is possible to pass a parabola through 3 contiguous ordinates, the highest computed $S_K$, and the associated closest adjacent computed values of $S_{K'+1}$ and $S_{K'-1}$.

The fractional index factor $K_P$ corresponding to the highest point on the parabola is calculated by adding the integer value $K'$ that corresponds to the maximum $S_{K'}$ calculated for the curve of FIG. 3 and a correction factor $K_C = (S_{K'+1} - S_{K'-1})/2[2S_{K'} - (S_{K'-1} + S_{K'+1})]$. Of course, the azimuth estimate $(\Delta\alpha)$ $[K_P + K_C]$ will necessarily be an approximation of the azimuth of the actual target.

It should be appreciated that the approximation of the maximum point on the parabola will be closer to the actual maximum point on the $S_{K''}$ curve of FIG. 3 if the number of candidate azimuths is, for example, doubled so that $K' = 0$, $K' = \frac{1}{2}$, $K' = 1$, etc. Actually, this need only be done in the vicinity of $K'$ in FIG. 3. If M is relatively small, for example $M = 8$, it may be necessary to calculate such additional values of $S_K$, at fractional values of K. Of course, such fractional values of K correspond to candidate targets having positions between adjacent antennas.

Thus, in the above computation, if M is small, a new value of $S_K$ may be computed at the intermediate point $K' + \frac{1}{2}$ and this new value may be used with the adjacent points $S_{K'+1}$ and $S_{K'}$ to fit a new parabola to the S curve to derive a closer approximation $K_{P'}$ to the actual maximum value of $S_K$ of the S curve, where $$K_{p'} = K_P + \frac{S_{K'+1} + S_{K'}}{2[2S_{K'+\frac{1}{2}} - (S_{K'} + S_{K'+1})]}.$$

Usually, one such iteration will be sufficient to derive a very close approximation of a position value of $K''$ that will correspond to the maximum $S_{K''}$ of the S curve. Of course, the interpolation could be accomplished with any intermediate point $S_{K+n}$ between $S_{K'}$ and $S_{K'+1}$ or $S_{K'-1}$.

FIG. 4 illustrates a block diagram of an apparatus for deriving an approximation of the azimuth of a particular actual target source 3 according to the mathematical theory described above. In accordance with the invention, a ROM 45 is used to store trigonometric values of $U_K$ and $V_K$ corresponding respectively to the cosine and sine of $2\pi K/M$, where K is a trigonometric index corresponding to the successive azimuth positions of the candidate target. For example, $K = 0$ would define a candidate target at a first azimuth position corresponding to the position of the azimuth reference antenna of the array 1. Likewise, successive incremented values of K would define successive azimuth positions of the candidate target positioned adjacent successive antenna members of the array 1.

Likewise, a RAM 47 module is used to receive and store the running averages $\overline{X}_i$, $\overline{Y}_i$ of the measured baseband rectangular components X and Y for each antenna i.

The command pulse CP is then generated by the azimuth generator 39 and the pulse is applied to a microprocessor 49 or other similar control device that is then used to access the ROM 45 and RAM 47 and to perform the computations necessary to determine an approximate azimuth for the target 3.

In operation, the microprocessor 49 generates successive index values of K to access the ROM module 45 and to thereby obtain particular values of $U_K$ and $V_K$. For each candidate target position $K'$ the microprocessor reads a particular corresponding value of $U_{K'}$ and $V_{K'}$ and thereafter accesses the RAM module 47 to successively read all of the stored values of $\overline{X}_i$ and $\overline{Y}_i$. Thereafter, the microprocessor operates multiplier circuits 50 and 51 to respectively multiply $U_{K'}$ times each of the stored values of $\overline{X}_i$ and $V_{K'}$ times each of the stored values of $\overline{Y}_i$. The products are then added by an adder 52 to calculate a particular value of $S_{K'}$ for the candidate target azimuth index $K'$ or target azimuth $(\Delta\alpha)K'$ and the computed value of $S_{K'}$ is stored in a RAM memory module 53.

The calculation process is repeated until a value $S_{K'}$ is stored for each candidate target azimuth for $K' = 1$ to M. Thereafter, the stored values of $S_{K'}$ are compared, for example in accordance with a computer program, and the highest stored value $S_{K'}$ and its associated index $K'$ are selected (as depicted in FIG. 3).

Of course, the index value $K'$ for the highest value $S_{K'}$ will itself provide a rough approximation of the azimuth of the actual target source 3. However, to more closely approximate the azimuth of the actual source 3, the microprocessor operates to select the adjacent values $S_{K'+1}$ and $S_{K'-1}$. The selected values of $S_K$ are then used to compute an interpolated index $K_P$ for which an interpolated value of $S_{KP}$ is a maximum, for example in accordance with the above-described parabolic interpolation program, and the approximate azimuth is calculated from the interpolated value $K'$ and a correction factor $K_C$.

In performing an interpolation calculation, the microprocessor 49 operates an adder 55 to add the values $S_{K'+1}$ and $S_{K'-1}$. In addition, a multiplier 56 is operated to multiply $S_{K'}$ by 2 and a subtractor is operated to subtract a signal corresponding to $S_{K'-1} + S_{K'+1}$ from the signal for $2S_{K'}$. Thereafter, the output of the subtractor 57 is multiplied by 2 by a multiplier 59 to generate a denominator interpolation value that is applied to a divider 61.

A numerator interpolation value is generated by a subtractor 60 subtracting a signal corresponding to $S_{K'-1}$ from a signal corresponding to $S_{K'+1}$ and the numerator value is applied to the divider 61 to generate a quotient signal corresponding to the division of the numerator signal and the denominator signal. The quotient signal of the divider 61 corresponds to an interpolation index factor $K_C$ that is added to the index value $K'$ corresponding to $S_{K'}$. The resulting sum $K_P$ is an interpolated index value that corresponds to the maximum point on the curve of the parabolic interpolation. The interpolated index value $K_P$ may thereafter be multiplied by a constant 360/M to generate a signal corresponding to the approximate azimuth of the actual target source 3. Of course, the same interpolation calculation may be performed for other values, for example $S_{K'}$, $S_{K'+\frac{1}{2}}$, and $S_{K'+1}$.

It should be appreciated that although a parabolic interpolation is described, other more accurate interpolations could be used. In addition, as indicated above, other fractional index values could be used for the addresses K of the trig table to narrow the interpolation interval and to thereby improve the accuracy of the interpolation. However, it has been experimentally found satisfactory to use integer values of K of from 0 to 11 and an antenna array of 12 antennas to obtain a reasonably accurate approximation of the azimuth position of a particular target.

Figure 5:
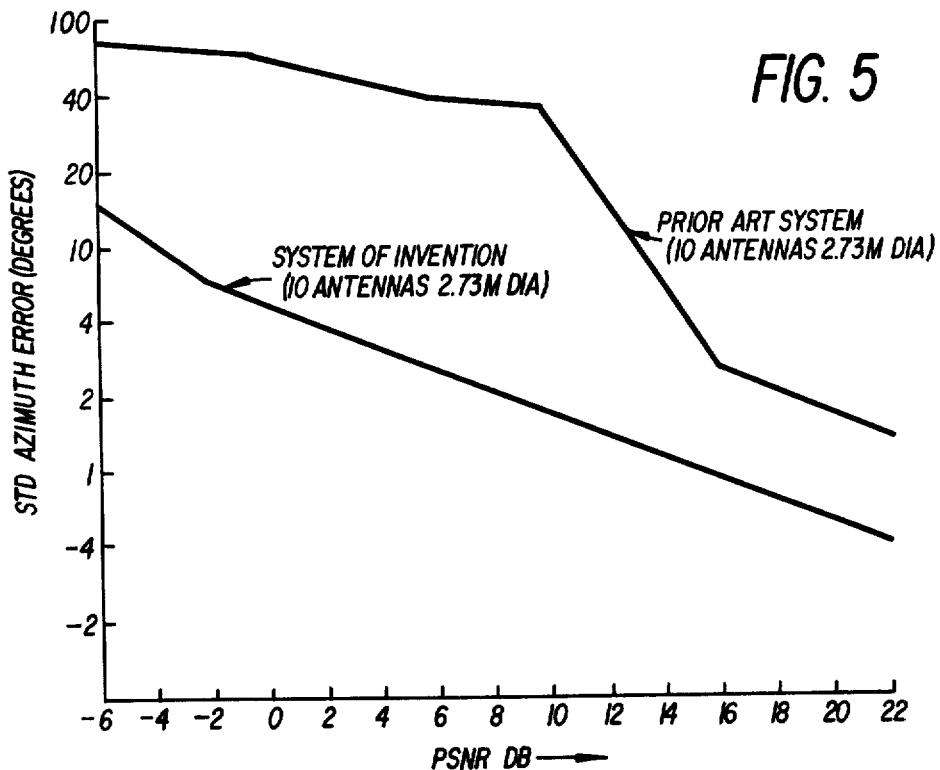
FIG. 5 is a plot of the standard deviation of the error in locating the target azimuth against the system signal to noise ratio for a 110 MHZ signal for both prior art and inventive system.
Figure 6:
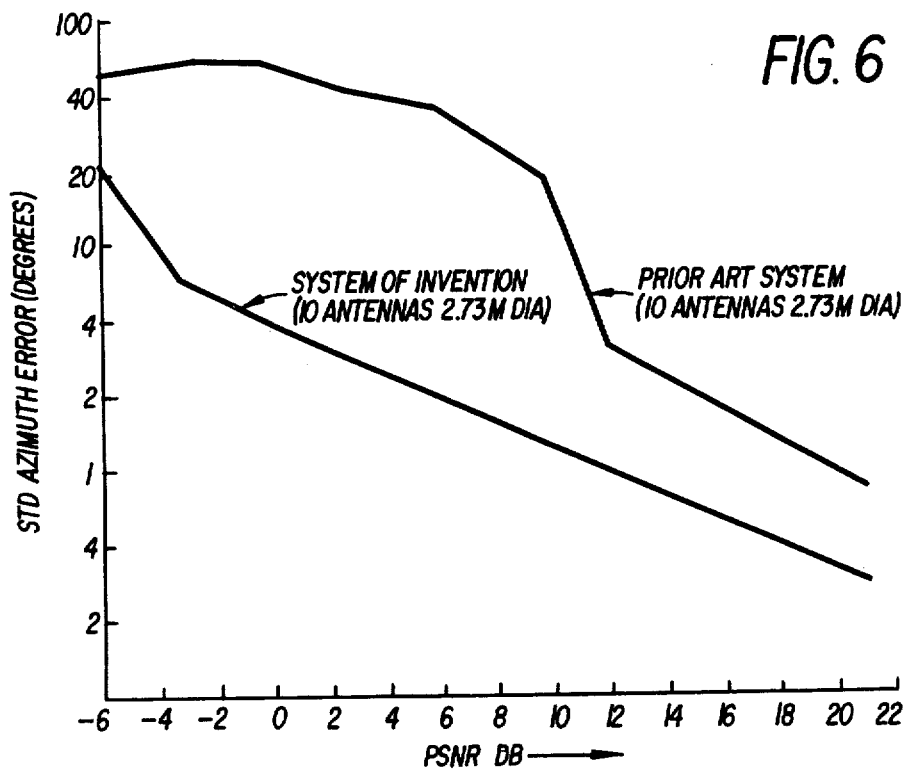
FIG. 6 is a plot of the standard deviation of the error in locating the target azimuth against the system signal to noise ratio for a 150 MHZ signal for both prior art and inventive system.

FIGS. 5 and 6 illustrate the comparative performance of the direction finder apparatus of the invention with respect to the performance of direction finders in the prior art. The graphs of FIGS. 5 and 6 show the standard deviation STD of the error in degrees in target azimuth location versus the system db signal to noise ratio SNR for operation at 110 MHZ and 150 MHZ, respectively. For a signal to noise ratio greater than approximately 15 db, every 6 db increase of signal to noise ratio halves the value of the standard deviation STD of azimuth location error. As indicated by the curves of FIGS. 5 and 6, the performance of the direction finding method and apparatus of the invention is approximately 10 db better than that of the prior art.

Thus, it should be appreciated that for the same direction finding system noise figure, and the same transmitted power from the target, the improved direction finding system of the invention can determine the azimuth location of line of sight targets at about 3 times the distance of the systems of the prior art.

In addition, for a system signal to noise ratio of less than about 14 db, there is a rapid catastrophic deterioration in performance of prior art direction finding systems. However, the improved direction finding system of the invention shows a desirable gradual rather than catastrophic reduction of accuracy with the decreasing system signal to noise ratio.

It should be understood that the abscissa of FIGS. 5 and 6 are the db and SNR for data that is obtained from one rotation of the antenna commutator. However, for every doubling of the number of rotations over which the received phasor data are averaged, 3 db should be added to the abscissa.

For example, if the phasor data from 16 antenna rotations are averaged, the effective system SNR is increased by 12 db. Thus, for a system SNR of 0 db, the overall system SNR is 12 db which, from FIG. 5, results in a 1.5 degree STD azimuth error for the improved direction finding system, compared with a 10 STD degree error for the prior art system. The improved performance of the system of the invention is due to the optimal use of all of the phasor data information received by all the antennas of the array.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A direction finder for deriving an approximation of the azimuth of a target source of signals, comprising:
    array receiving means having a plurality of receiving elements arranged in a spaced relation to receive the signals from said target source,
    central receiving means for receiving the signals from the target source;
    phase shift means for receiving signals from said central receiving means and generating a corresponding first signal having the same phase as the received signal and a second signal shifted 90° in phase with respect to said first signal;
    array commutation means for successively scanning the signal of each of said receiving elements for a commutation time interval and generating a select output signal corresponding to the scanned signal;
    coordinate generation means for receiving said first and second signals and said select output signal for each receiving element of the array and generating corresponding first and second coordinate average signals, said coordinate average signals representing a running average of the baseband rectangular components of the phasors for the signals received by the receiving element over a plurality of scans of the array;
    computation means for comparing azimuth candidate coordinate signals corresponding to the rectangular components of the candidate azimuth phasors of candidate azimuth targets to said first and second coordinate average signals of each receiving element to identify a candidate target azimuth having coordinate signals approximating the coordinate average signals of the receiving elements and an azimuth approximating the azimuth of the target source.

2. The direction finder of claim 1 wherein the receiving elements of said array receiving means are antennas arranged in a circular array.

3. The direction finder of claim 2 wherein said central receiving means is an antenna disposed at the center of said circular array of antennas.

4. The direction finder of claim 1 wherein said phase shift means includes:
    an intermediate frequency translation means for translating the signal received by said central receiving means to a corresponding intermediate frequency signal;
    a first phase locked loop means for receiving said intermediate frequency signal and generating said first signal in a phase-locked relation to the intermediate frequency signal; and
    a second phase locked loop means for receiving said first phase locked signal and generating said corresponding second signal shifted 90° in phase with respect to said first signal.

5. The direction finder of claim 1 wherein said array commutation means includes means for generating said select output signal at an intermediate frequency with respect to the signal of the target source.

6. The direction finder of claim 1 wherein said coordinate generation means includes:
    first integration means for integrating the product of the select output signal of a receiving element and the associated first signal over said commutation time interval and generating a corresponding integrated first coordinate signal;
    first averaging means for receiving the first coordinate signals that are generated over a plurality of scans of the array and generating for each receiving element the corresponding first coordinate average signal;

second integration means for integrating the product of the select output signal of a receiving element and the associated second signal over said commutation time interval and generating a corresponding second integrated coordinate signal;

second averaging means for receiving the second coordinate signals that are generated over a plurality of scans of the array and generating for each receiving element the corresponding second coordinate average signal.

7. The direction finder of claim 1 wherein said computation means includes a microprocessor for computing S factors relating the first and second coordinate average signals of the receiving elements to coordinate signals defining the rectangular components of the candidate phasors of candidate targets, and selecting the maximum computed S factor $S_{K'}$ and an associated index integer K' to derive a candidate azimuth approximating the azimuth of the target source.

8. The direction finder of claim 7 wherein said microprocessor includes means for interpolating between S factors $S_{K'+1}$ and $S_{K'-1}$ most closely associated with $S_{K'}$ to derive an interpolation index factor $K_C$ that may be added to the index integer K' to calculate an interpolated maximum index factor $K_P$ and a corresponding candidate azimuth more closely approximating the azimuth of the target source.

9. The direction finder of claim 8 wherein said microprocessor includes means for defining a point $S_{K'+n}$ between $S_{K'}$ and one of said most closely associated S factors and deriving an additional interpolation index factor that may be added to the maximum index integer $K_P$ to calculate an additional interpolated maximum index factor $K_{P'}$ and a corresponding additional candidate azimuth that most closely approximates the azimuth of the target source.

10. The direction finder of claim 1 including means for converting the signals received by said central receiving means to corresponding audio signals.

11. A direction finding method for deriving an approximation of the azimuth of a target source of signals, comprising the steps of:

receiving target signals from said target source at a plurality of spaced receiving positions in a signal receiving array;

receiving target signals from said target source at a central receiving position with respect to said signal receiving array;

generating a first phase-locked signal corresponding to the target signal received at said central receiving position;

generating a second phase-locked signal shifted 90° in phase with respect to said first phase-locked signal;

successively scanning each of said spaced receiving positions in said signal receiving array for a commutation time interval and generating a corresponding select output signal for each scanned receiving position in said array;

generating over each scan of said array a first and a second coordinate signal for each position in said array, said first coordinate signal corresponding to the integrated product of said first phase-locked signal and the associated select output signal and said second coordinate signal corresponding to the integrated product of said second phase-locked signal and the associated select output signal, the products being integrated over said commutation time interval;

computing for each receiving position of the array a first running average of the first coordinate signals generated for the array position over a plurality of complete scans of the array, and a second running average of the second coordinate signals that are generated for the array position over a plurality of complete scans of the array;

comparing measured phasors corresponding to the running averages of each receiving position of the array to candidate phasors of particular candidate targets;

selecting the candidate azimuth target having candidate phasors most closely approximating the measured phasors; and determining an azimuth corresponding to the selected candidate target that approximates the azimuth of the target source.

12. The method of claim 11 including converting the signals received at said central receiving position to corresponding audio signals.

13. The method of claim 11 wherein said step for comparing measured phasors and running averages includes:

computing for each candidate target an S factor that relates the first and second running averages of the signals of the array positions to the corresponding coordinate components of the candidate phasor of the candidate target; and defining for each candidate target an index integer K that indicates the position of the candidate target with respect to a north azimuth reference.

14. The method of claim 13 wherein said step for selecting the candidate target includes:

selecting the S factor having the greatest magnitude $S_{K'}$.

15. The method of claim 14 wherein said step for determining the azimuth includes using the index integer K' of the maximum S factor $S_{K'}$ and the number M of array receiving positions to calculate the approximate azimuth according to the relation: $2\pi K'/M$.

16. The method of claim 14 wherein said step for determining the azimuth includes:

selecting S factors $S_{K'+1}$ and $S_{K'-1}$ most closely associated with the maximum S factor $S_{K'}$ and the index factor K' of $S_{K'}$;

deriving a maximum interpolated index factor $K_P$ corresponding to the maximum point on a parabolic curve through the points $S_{K'}$, $S_{K'-1}$ and $S_{K'+1}$ according to the relation:

$$K_P = K' + \frac{S_{K'+1} - S_{K'-1}}{2[2S_{K'} - (S_{K'-1} + S_{K'+1})]} ; \text{ and}$$

using the maximum interpolated index factor $K_P$ and the number M of array receiving positions to calculate the approximate azimuth according to the relation: $2\pi K_P/M$.

17. The method of claim 14 wherein said step for determining the azimuth includes:

selecting S factors $S_{K'+1}$ and $S_{K'-1}$ most closely associated with the maximum S factor $S_{K'}$ and the index factor K' of $S_{K'}$;

deriving a maximum interpolated index factor $K_P$ corresponding to the maximum point on a parabolic curve through the points $S_{K'}$, $S_{K'+1}$ and $S_{K'-1}$ according to the relation:

$$K_p = K' + \frac{S_{K'+1} - S_{K'-1}}{2[2S_{K'} - (S_{K'+1} + S_{K'-1})]};$$

selecting an additional S factor $S_{K'+\frac{1}{2}}$;
deriving an additional maximum interpolated index factor $K_{p'}$ corresponding to the maximum point on a second parabolic curve through the points $S_{K'}$, $S_{K'+\frac{1}{2}}$ and $S_{K'+1}$ according to the relation:

$$K_{p'} = K_p + \frac{S_{K'} - S_{K'+1}}{2[2S_{K'+\frac{1}{2}} - (S_{K'} + S_{K'+1})]}; \text{ and}$$

using the additional maximum interpolated index factor $K_{p'}$ and the number M of array receiving positions to calculate the approximate azimuth according to the relation: $2\pi K_{p'}/M$.

* * * * *